(12) United States Patent
Keith

(10) Patent No.: US 11,243,400 B1
(45) Date of Patent: Feb. 8, 2022

(54) SPACE SUIT HELMET HAVING WAVEGUIDE DISPLAY

(71) Applicant: Rockwell Collins, Inc., Cedar Rapids, IA (US)

(72) Inventor: Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/932,241

(22) Filed: Jul. 17, 2020

(51) Int. Cl.
| | | |
|---|---|---|
| *G02B 27/01* | (2006.01) | |
| *G02B 27/00* | (2006.01) | |
| *A42B 3/04* | (2006.01) | |
| *B64G 6/00* | (2006.01) | |
| *G06F 3/16* | (2006.01) | |

(52) U.S. Cl.
CPC .......... *G02B 27/0172* (2013.01); *A42B 3/042* (2013.01); *B64G 6/00* (2013.01); *G02B 27/0093* (2013.01); *G02B 27/0101* (2013.01); *G02B 2027/0123* (2013.01); *G06F 3/167* (2013.01)

(58) Field of Classification Search
CPC .............. G02B 27/017; G02B 27/0172; G02B 27/0101; G02B 27/0093; G06F 3/013; B64G 6/00; A42B 3/042
See application file for complete search history.

(56) References Cited

U.S. PATENT DOCUMENTS

| | | | |
|---|---|---|---|
| 4,897,715 A | 1/1990 | Beamon, III | |
| 5,091,719 A | 2/1992 | Beamon, III | |
| 5,420,828 A | 5/1995 | Geiger | |
| 5,535,025 A | 7/1996 | Hegg | |
| 5,715,094 A | 2/1998 | Ansley et al. | |
| 9,247,779 B1 | 2/2016 | Aloumanis et al. | |
| 9,445,639 B1 | 9/2016 | Aloumanis et al. | |
| 9,500,868 B2 | 11/2016 | Dopilka et al. | |
| 9,500,869 B2 | 11/2016 | Amitai | |
| 9,618,750 B2 | 4/2017 | Simmonds et al. | |
| 9,733,475 B1 | 8/2017 | Brown et al. | |
| 9,766,465 B1 | 9/2017 | Tiana et al. | |
| 9,977,245 B2 | 5/2018 | Mack et al. | |
| 10,067,560 B1* | 9/2018 | Koenck | G01S 19/13 |

(Continued)

FOREIGN PATENT DOCUMENTS

| | | |
|---|---|---|
| CN | 207571392 U | 7/2018 |
| CN | 109512074 A | 3/2019 |
| GB | 2567954 A | 5/2019 |

OTHER PUBLICATIONS http://www.luminitrd.com/HOE.html, "Holographic Optical Elements (HOE)", Luminit, Downloaded Jun. 3, 2020.

*Primary Examiner* — Xuemei Zheng
(74) *Attorney, Agent, or Firm* — Suiter Swantz pc llo

(57) ABSTRACT

A system may include a space suit helmet. The space suit helmet may include a surface structure, an inner surface structure, and a waveguide display. The inner surface structure may be configured to maintain an oxygenated environment within an interior cavity of the space suit helmet, wherein a user is able to see through the inner surface structure and the surface structure. The waveguide display may be implemented at least one of in or on the space suit helmet. The waveguide display may include a waveguide and an optical system configured to project images at least through the waveguide to be displayed to the user.

18 Claims, 9 Drawing Sheets

(56) References Cited

U.S. PATENT DOCUMENTS

| | | |
|---|---|---|
| 10,325,560 B1 | 6/2019 | Tiana et al. |
| 10,642,038 B1 | 5/2020 | Schuyler et al. |
| 2016/0109943 A1* | 4/2016 | Larson ................. G02B 27/017 345/8 |
| 2016/0131906 A1* | 5/2016 | Dopilka ............. G02B 27/0172 345/8 |
| 2017/0038593 A1* | 2/2017 | Travers ................ G02B 6/0001 |
| 2019/0250408 A1* | 8/2019 | Lafon .................... B64D 43/00 |
| 2019/0293943 A1 | 9/2019 | Weller et al. |
| 2019/0353910 A1 | 11/2019 | Gwalani et al. |

\* cited by examiner

900

902 — PROVIDING A SPACE SUIT HELMET, COMPRISING A SURFACE STRUCTURE, AN INNER SURFACE STRUCTURE, AND A WAVEGUIDE DISPLAY, WHEREIN THE INNER SURFACE STRUCTURE IS CONFIGURED TO MAINTAIN AN OXYGENATED ENVIRONMENT WITHIN AN INTERIOR CAVITY OF THE SPACE SUIT HELMET, WHEREIN A USER IS ABLE TO SEE THROUGH THE INNER SURFACE STRUCTURE AND THE SURFACE STRUCTURE, WHEREIN THE WAVEGUIDE DISPLAY IS IMPLEMENTED AT LEAST ONE OF IN OR ON THE SPACE SUIT HELMET, WHEREIN THE WAVEGUIDE DISPLAY COMPRISES A WAVEGUIDE AND AN OPTICAL SYSTEM CONFIGURED TO PROJECT IMAGES AT LEAST THROUGH THE WAVEGUIDE TO BE DISPLAYED TO THE USER

FIG.9

SPACE SUIT HELMET HAVING WAVEGUIDE DISPLAY

BACKGROUND

Currently, space suits only have a single-line display located on a chest of the suit, and astronauts make use of paper booklets on their forearm. There is a need for more accessible and ready information. Currently, there are requirements to minimize the number of items an astronaut physically wears on their head, such as headsets, microphones, caps, and near-eye displays. Additionally, an oxygenated interior cavity of space suit helmets has regulated limitations for an amount of electrical current for electronics within the interior cavity to reduce the possibility of combustion within the space suit helmet. Additionally, space suits are not currently custom fitted to each wearer. Space suits are typically designed to accommodate a range of astronauts.

SUMMARY

In one aspect, embodiments of the inventive concepts disclosed herein are directed to a system. The system may include a space suit helmet. The space suit helmet may include a surface structure, an inner surface structure, and a waveguide display. The inner surface structure may be configured to maintain an oxygenated environment within an interior cavity of the space suit helmet, wherein a user is able to see through the inner surface structure and the surface structure. The waveguide display may be implemented at least one of in or on the space suit helmet. The waveguide display may include a waveguide and an optical system configured to project images at least through the waveguide to be displayed to the user.

In a further aspect, embodiments of the inventive concepts disclosed herein are directed to a method. The method may include: providing a space suit helmet, comprising a surface structure, an inner surface structure, and a waveguide display, wherein the inner surface structure is configured to maintain an oxygenated environment within an interior cavity of the space suit helmet, wherein a user is able to see through the inner surface structure and the surface structure, wherein the waveguide display is implemented at least one of in or on the space suit helmet, wherein the waveguide display comprises a waveguide and an optical system configured to project images at least through the waveguide to be displayed to the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9 is a diagram of an exemplary embodiment of a method according to the inventive concepts disclosed herein.

DETAILED DESCRIPTION

Figure 1:
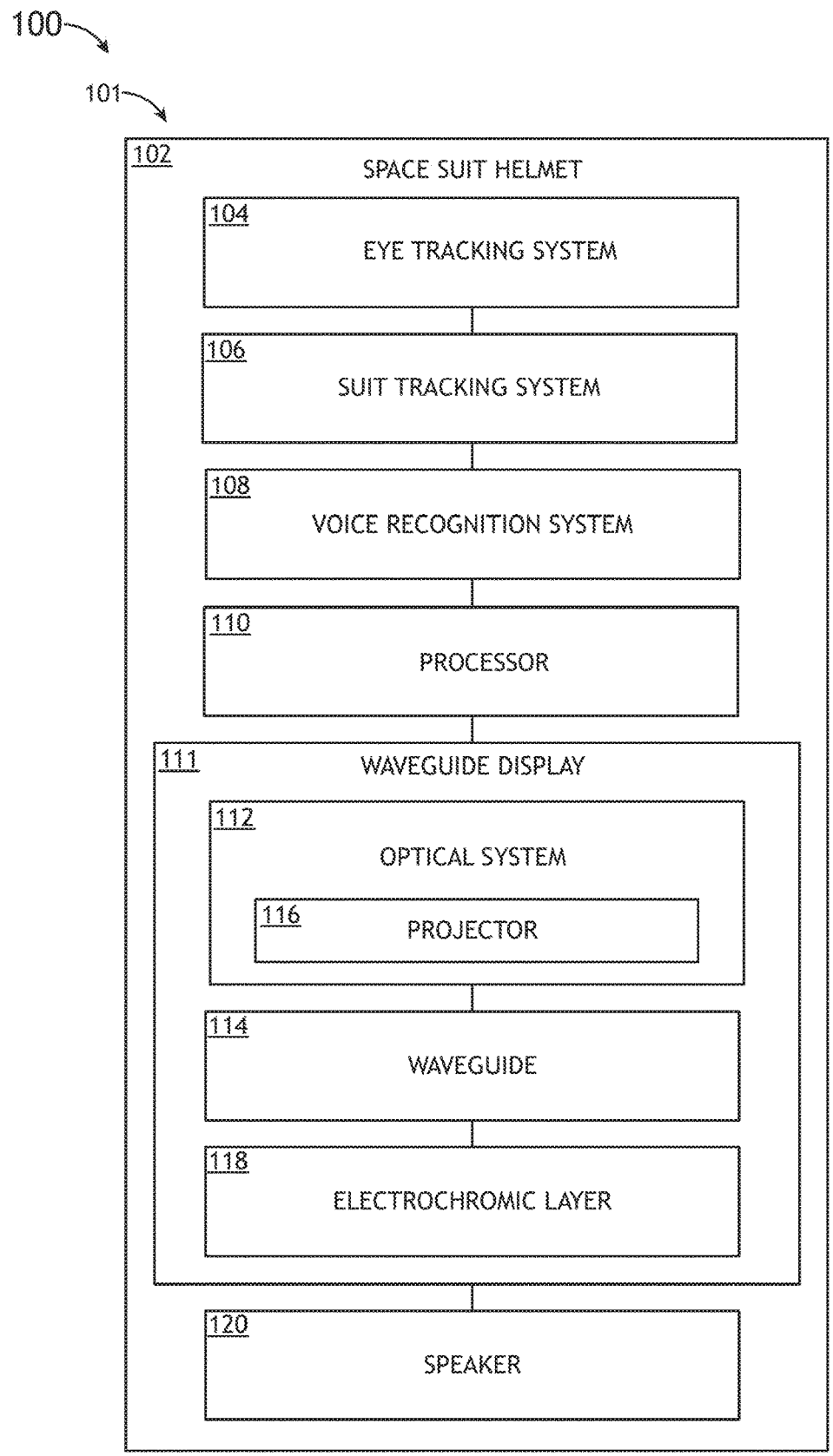
FIG. 1 is a view of an exemplary embodiment of a system including a space suit helmet according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a space suit helmet having a waveguide display.

Some embodiments may include a waveguide display integrated into a space suit helmet to provide real-time conformal or non-conformal information to a user (e.g., an astronaut wearing the helmet). In some embodiments, the waveguide display for the space suit helmet may have various configurations, such as a side-mounted display attached a side of the space suit helmet, a display mounted inside an oxygen enriched environment of the space suit helmet, a waveguide display installed in between an at least translucent (e.g., translucent and/or transparent) inner surface structure (e.g., a pressure bubble) and an at least translucent (e.g., translucent and/or transparent) outer surface structure (e.g., an impact bubble), and/or a waveguide display mounted external to the pressure bubble and the impact bubble. Some embodiments enable a small, compact display assembly to be integrated into the suit, which has not been possible with previous display technologies.

Previously conceived optical display solutions required large and bulky optics with the display sources remote from the apparatus that the user looks into in order to see the display. Some embodiments may allow for the viewing apparatus to be placed between the impact and pressure bubbles, which may protect the display itself as well as maximizing volume inside the bubble for the user to move around and not bump into items placed inside the pressure bubble.

Referring now to FIGS. 1-4, an exemplary embodiment of a system 100 according to the inventive concepts disclosed herein is depicted. The system 100 may be implemented as any suitable system, such as at least one vehicle (e.g., a spacecraft). For example, as shown in FIG. 1, the system 100 may include at least one suit (e.g., a space suit 101). For example, the space suit 101 may include a space suit helmet 102. In some embodiments, the space suit helmet 102 may include at least one eye tracking system 104, at least one suit tracking system 106, at least one voice recognition system 108, at least one processor 110, at least one waveguide display 111, at least one power supply (not shown), and/or at least one speaker 120, some or all of which may be communicatively coupled at any given time. For example, the waveguide display 111 may include the at least one optical system 112, at least one waveguide 114, and/or at least one tint layer (e.g., at least one electrochromic layer 118), some or all of which may be optically and/or communicatively coupled at any given time.

Figure 2:
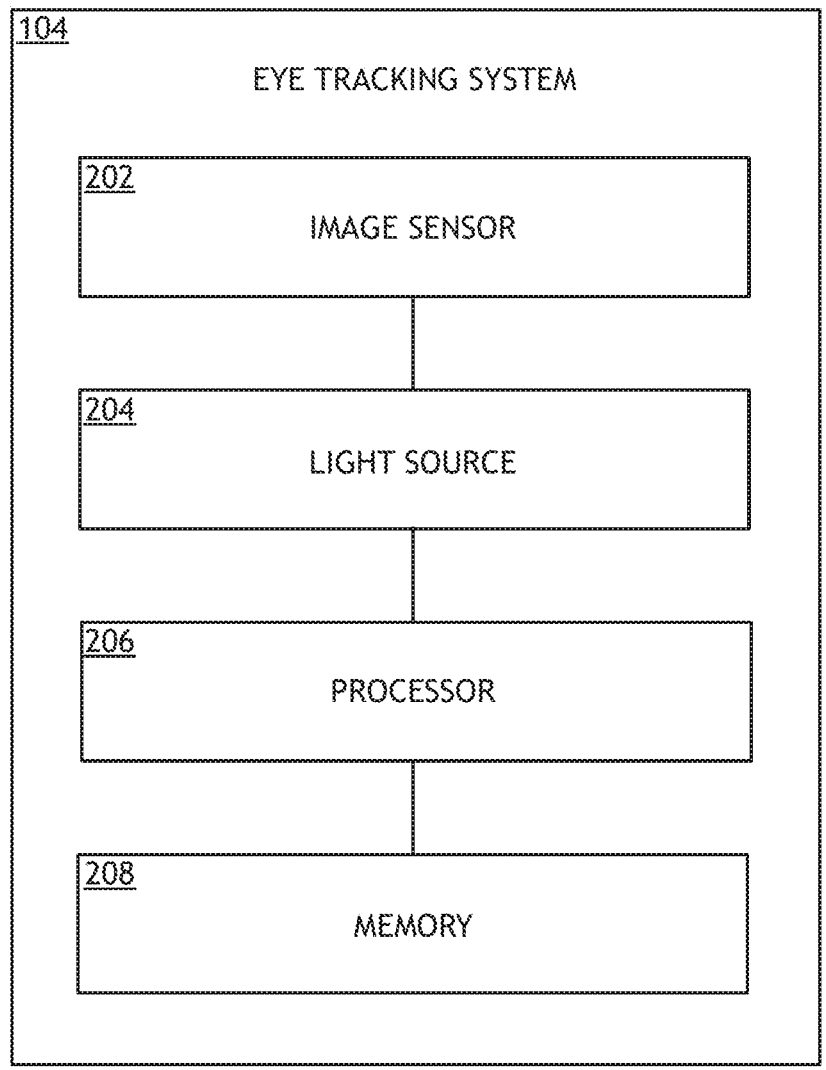
FIG. 2 is a view of the eye tracking system of FIG. 1 according to the inventive concepts disclosed herein.

The eye tracking system 104 may include at least one infrared light source 204 (e.g., at least one infrared light emitting diode (LED)), at least one infrared image sensor 202, at least one processor 206, and at least one memory 208, as well as other components, equipment, and/or devices commonly included in an eye tracking system, some or all of which may be communicatively coupled at any time, as shown in FIG. 2. The eye tracking system 104 may be configured to track eye gestures, track movement of a user's eye, track a user's gaze, and/or otherwise receive inputs from a user's eyes. The eye tracking system 104 may be configured for performing fully automatic eye tracking operations of users in real time.

The infrared light source 204 may be configured to emit infrared light onto at least one eye of a user.

The infrared sensitive image sensor 202 may be configured to capture images of the at least one eye illuminated by the infrared light source 204.

The processor 206 may be configured to process data received from the infrared sensitive image sensor 202 and output processed data (e.g., eye tracking data) to one or more devices or systems of the space suit helmet 102 and/or the system 100. For example, the processor 206 may be configured to generate eye tracking data and output the generated eye tracking data to one of the devices (e.g., the processor 110) of the space suit helmet 102 and/or the system 100. The processor 206 may be configured to run various software applications or computer code stored (e.g., maintained) in a non-transitory computer-readable medium (e.g., memory 208) and configured to execute various instructions or operations. The processor 206 may be implemented as a special purpose processor configured to execute instructions for performing (e.g., collectively performing if more than one processor) any or all of the operations disclosed throughout. For example, the processor 206 may be configured to: receive image data from the infrared sensitive image sensor 202; track movement of at least one eye of a user based on the image data; and/or output eye tracking system data indicative of the tracked movement of the at least one eye of the user. For example, the processor 206 may be configured to: perform visor distortion correction operations; perform eye mapping and alignment operations; output, via at least one data connection, eye tracking system data (e.g., indicative of eye azimuth and/or elevation) to a spacecraft interface, simulator interface, and/or other computing device of the system 100; and/or perform a suit tracking translation operation.

Figure 3:
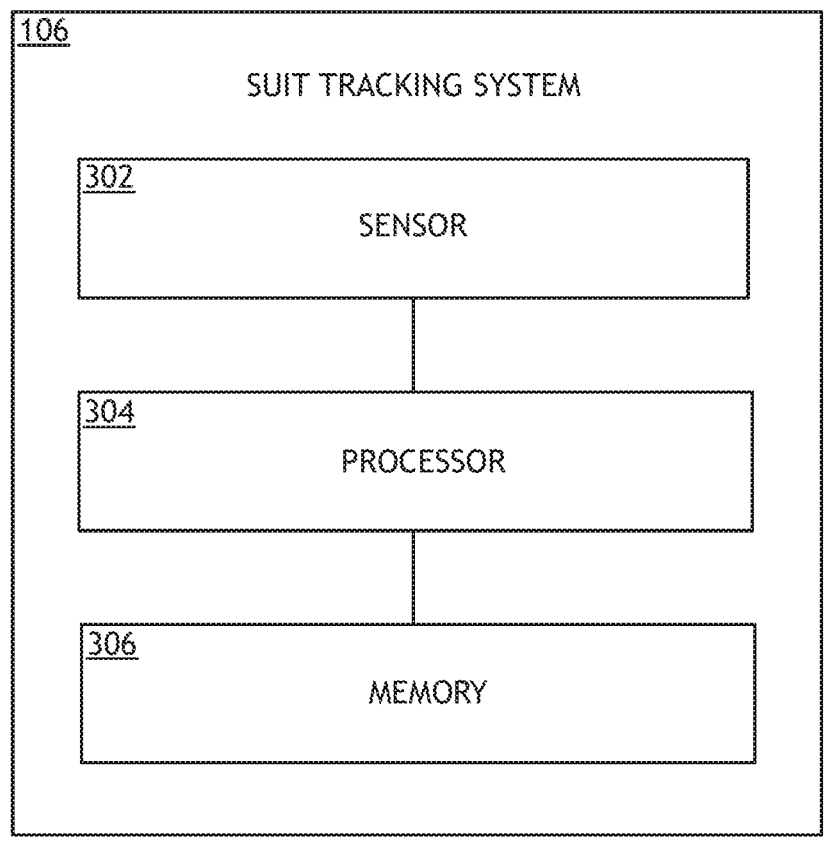
FIG. 3 is a view of the suit tracking system of FIG. 1 according to the inventive concepts disclosed herein.

The suit tracking system 106 may have optical, magnetic, and/or inertial tracking capability. In some embodiments, the suit tracking system 106 may include suit tracking capabilities and/or be coordinated with suit tracking capabilities, for example, such that the suit tracking operations are relative to a position and/or orientation of the suit 101 and/or relative to a position and/or orientation to a vehicle. For example, suit tracking system 106 may be configured to track a direction of where a field of view (FOV) through the waveguide display 111 is pointing. For example, if the waveguide display 111 is mounted to the suit 101 (e.g., to the space suit helmet 102), this direction may be a direction that a torso or bubble is pointing that is being tracked. The suit tracking system 106 may include at least one sensor 302, at least one processor 304, and at least one memory 306, as well as other components, equipment, and/or devices commonly included in a suit tracking system, some or all of which may be communicatively coupled at any time, as shown in FIG. 3. The at least one sensor 302 may be at least one optical sensor (e.g., an optical infrared sensor configured to detect infrared light), at least one magnetic sensor, and/or at least one inertial sensor. The suit tracking system 106 may be configured to determine and track a position and an orientation of a user's head relative to an environment. The suit tracking system 106 may be configured for performing fully automatic suit tracking operations in real time. The processor 304 of the suit tracking system 106 may be configured to process data received from the sensors 302 and output processed data (e.g., suit tracking data) to one of the computing devices of the system 100 and/or the processor 110 for use in generating images aligned with the user's field of view, such as augmented reality or virtual reality images aligned with the user's field of view to be displayed by the waveguide display 111. For example, the processor 304 may be configured to determine and track a position and orientation of a user's head relative to an environment. Additionally, for example, the processor 304 may be configured to generate position and orientation data associated with such determined information and output the generated position and orientation data. The processor 304 may be configured to run various software applications or computer code stored in a non-transitory computer-readable medium (e.g., memory 306) and configured to execute various instructions or operations. The at least one processor 304 may be implemented as a special purpose processor configured to execute instructions for performing (e.g., collectively performing if more than one processor) any or all of the operations disclosed throughout.

Figure 4:
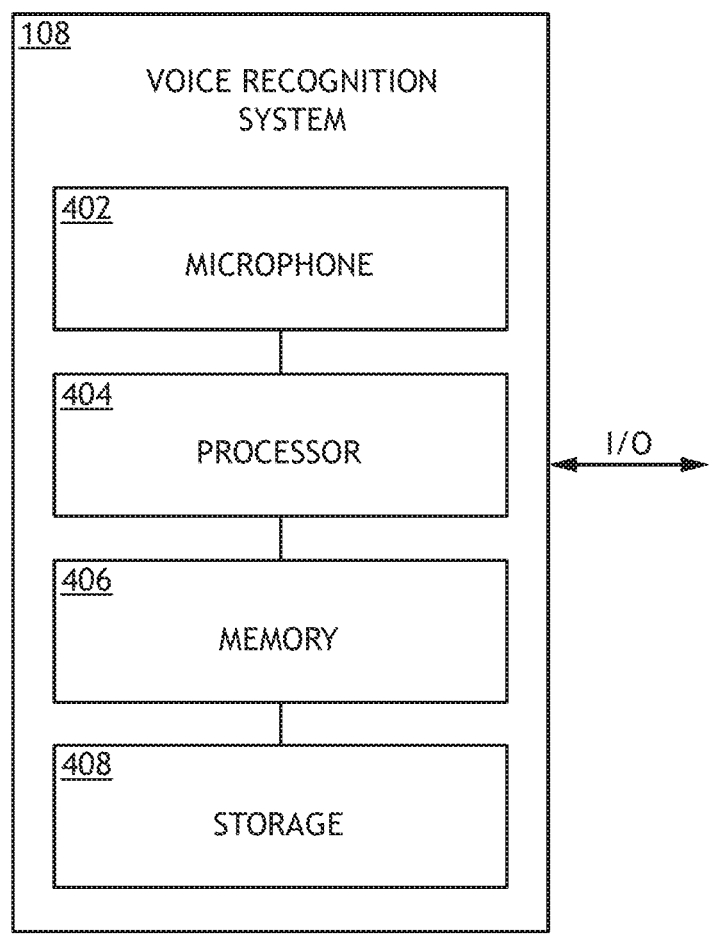
FIG. 4 is a view of the voice recognition system of FIG. 1 according to the inventive concepts disclosed herein.

The voice recognition system 108 may include at least one microphone 402, at least one processor 404, memory 406, and storage 408, as shown in FIG. 4, as well as other components, equipment, and/or devices commonly included in a voice recognition system. The microphone 402, the processor 404, the memory 406, and the storage 408, as well as the other components, equipment, and/or devices commonly included in a voice recognition system may be communicatively coupled. The voice recognition system 108 may be configured to recognize voice commands or audible inputs of a user. The voice recognition system 108 may allow the user to use verbal commands as an interaction and control method. The voice recognition system 108 may be configured to detect user commands and output user command data (e.g., voice command data), which, for example, may be used to provide commands to control operation of the waveguide display 111. Additionally, verbal commands may be used to modify, manipulate, and declutter content displayed by the waveguide display 111. The voice recognition system 108 may be integrated with the eye tracking system 104 so context of user inputs can be inferred. The processor 404 may be configured to process data received from the microphone 402 and output processed data (e.g., text data and/or voice command data) to a device of the system 100 and/or the processor 110. The processor 404 may be configured to run various software applications or computer code stored in a non-transitory computer-readable medium and configured to execute various instructions or operations The at least one processor 110 may be implemented as any suitable processor(s), such as at least one general purpose, at least one image processor, at least one graphics processing unit (GPU), and/or at least one special purpose processor configured to execute instructions for performing (e.g., collectively performing if more than one processor) any or all of the operations disclosed throughout. In some embodiments, the processor 110 may be communicatively coupled to the waveguide display element 111. For example, the processor 110 may be configured to: receive the eye tracking system data; receive the suit tracking system data; receive the voice command data; generate and/or output image data to the waveguide display 111 and/or to the optical system 112, for example, based on the eye tracking system data, the voice command data, and/or the suit tracking system data; generate and/or output image data to the optical system 112, for example, based on the eye tracking system data, the voice command data, and/or the suit tracking system data; generate and/or output augmented reality and/or virtual reality image data to the optical system 112, for example, based on the eye tracking system data, the voice command data, and/or the suit tracking system data; and/or generate and/or output other image data, which may include vehicle operation (e.g., space flight) information, navigation information, tactical information, and/or sensor information to the optical system 112, for example, based on the eye tracking system data, the voice command data, and/or the suit tracking system data.

For example, the processor 110 may be configured to: output graphical data to the optical system 112; control operation of the optical system based at least on the eye tracking data, the voice command data, and/or the suit tracking data; control whether the optical system is in an active state or deactivated state based at least on the eye tracking data, the voice command data, and/or the suit tracking data; control content displayed by the waveguide display 111 based at least on the eye tracking data, the voice command data, and/or the suit tracking data; steer a field of view of the waveguide display 111 based at least on the eye tracking data, the voice command data, and/or the suit tracking data; control an operation (e.g., an amount of tint) of the electrochromic layer 118, for example, based at least on the eye tracking data, the voice command data, the suit tracking data, and/or a sensed brightness; and/or output audio data to the at least one speaker 120 for presentation to the user, for example, based at least on the eye tracking data, the voice command data, and/or the suit tracking data.

The waveguide display 111 may be implemented as any suitable waveguide display. The waveguide display 111 may include the at least one optical system 112, at least one waveguide 114, and/or at least one tint layer (e.g., at least one electrochromic layer 118). For example, the optical system 112 may include at least one processor, at least one collimator, and/or at least projector 116. The optical system 112 may be configured to project images at least through the waveguide 114 to be displayed to the user. In some embodiments, the waveguide 116 may be a diffractive, mirror, or beam splitter based waveguide. In some embodiments, the waveguide display 111 may include at least one lens, at least one mirror, diffraction gratings, at least one polarization sensitive component, at least one beam splitter, the at least one waveguide 114, at least one light pipe, at least one window, and/or the projector 116.

The optical system 112 may be configured to receive image data from the processor 110 and project images through the waveguide 114 for display to the user.

The tint layer (e.g., the electrochromic layer 118) may be positioned on a side of a viewable portion of the waveguide 114 (e.g., positioned on a back side such that a viewable portion of the waveguide 114 is between the tint layer and the user 502). For example, the tint layer may improve a perceived brightness of content displayed by the waveguide display 111 in a high brightness environment. For example, the electrochromic layer 118 may receive an electric stimulus from the processor 110 and/or the optical system 112 to darken the electrochromic layer 118 so as to improve a perceived brightness. In some embodiments, the processor 110 and/or the optical system 112 may automatically control a tint level of the electrochromic layer 118 based at least on a sensed environmental brightness. For example, the electrochromic layer 118 may provide a variable tint. For example, the electrochromic layer 118 may dim real world ambient light from passing through a viewable portion of the waveguide 114 and improve display visibility.

Referring now to FIGS. 5-8, exemplary embodiments of a space suit helmet 102 of FIG. 1 worn by a user 502 (e.g., an astronaut) according to the inventive concepts disclosed herein are depicted. In addition to one or more of the elements shown in FIGS. 1-4, the space suit helmet 102 may include at least one ring 504, a first surface structure (e.g., an outer surface structure; e.g., an impact bubble 602), a second surface structure (e.g., an inner surface structure; e.g., a pressure bubble 606), a gap 604 between the first surface structure and the second surface structure, an interior cavity 608, and/or wires 610 (e.g., connecting the optical system 112 to the processor 110).

For example, the first surface structure (e.g., an outer surface structure; e.g., an impact bubble 602) and the second surface structure (e.g., an inner surface structure; e.g., a pressure bubble 606) may be coupled to the ring 504. The inner surface structure (e.g., the impact bubble 602) may be configured to maintain an oxygenated environment within the interior cavity 608 of the space suit helmet 102. The outer surface structure (e.g., the impact bubble 602) may be configured to absorb impacts. Each of the inner surface structure and the outer surface structure may be at least translucent (e.g., translucent or transparent), such that the user 502 is able to see through the inner surface structure and the outer surface structure. The inner surface structure and the outer surface structure may be any suitable shape, such as having at least one flat surface, at least one curved surface, or a combination thereof. For example, the outer surface structure may be the impact bubble 602, and the inner surface structure may be the pressure bubble 606.

The waveguide display 111 may be implemented in and/or on the space suit helmet 102. The waveguide display 111 may be positioned at any suitable location, such as in a direct forward view or some other location (e.g., off to a side of the user 502 and/or down at chin level of the user 502). In some embodiments, the waveguide display 111 may be adjustably positionable (e.g., tiltable and/or movable in a lateral and/or vertical direction), such as by use of a motor, magnets, a pivot joint, and/or a track); in some of such embodiments, the processor 110 may be configured to control an orientation and/or a position of a viewable portion of the waveguide display 111; in other of such embodiments, the orientation and/or the position of a viewable portion of the waveguide display 111 may be manually adjusted.

Figure 5:
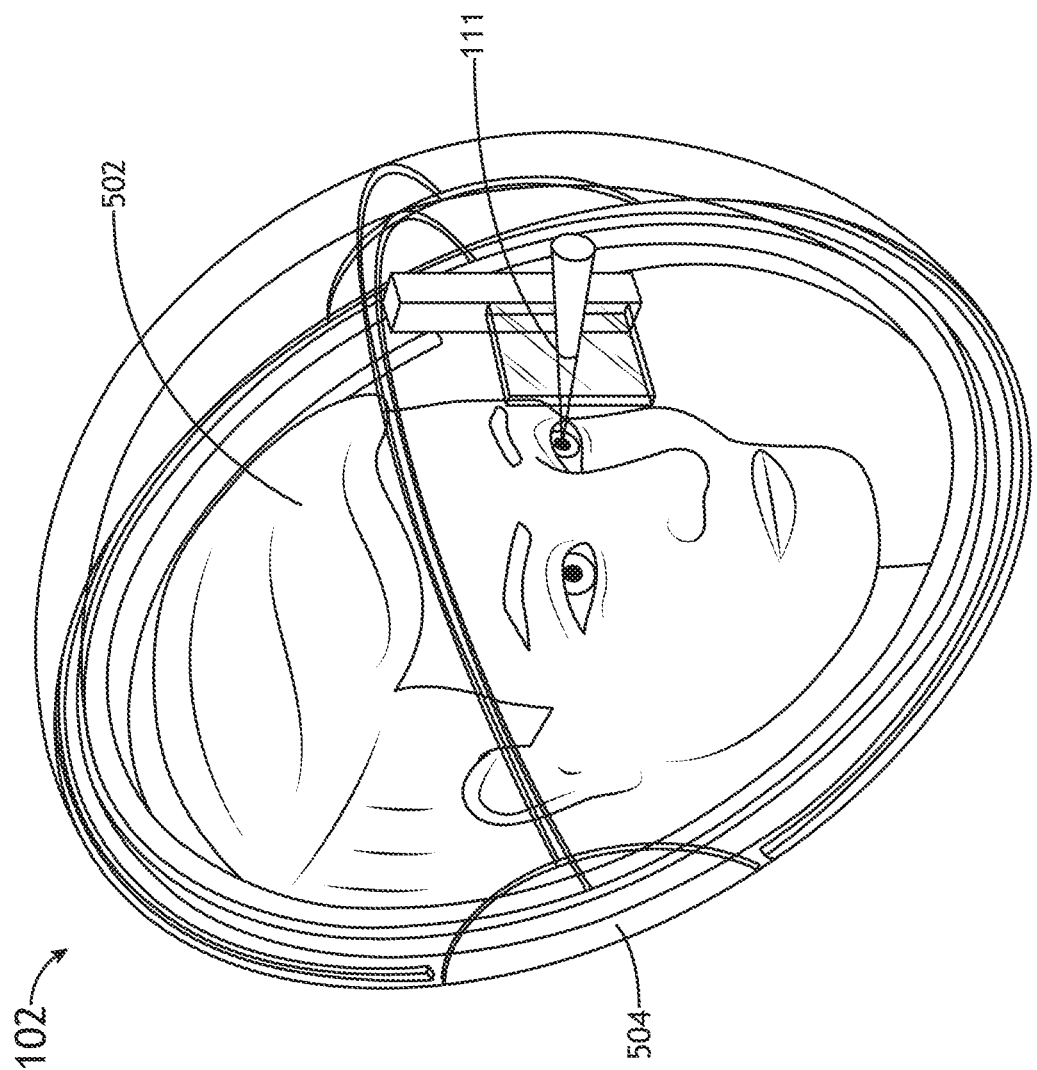
FIG. 5 is a view of an exemplary embodiment of the space suit helmet of FIG. 1 according to the inventive concepts disclosed herein.

As shown in FIG. 5, the waveguide display 111 may be mounted within space suit helmet 102 in the interior cavity 608. For example, the waveguide display 111 may be mounted to the space suit helmet 102 near the ring 504 at eye level such that (a) when the user 502 is looking straight ahead, the waveguide display 111 is in a field of view of at least one eye of the user 502 or (b) when the user 502 looks to the side (e.g., the left or right side), the waveguide display 111 is in a field of view of at least one eye of the user 502.

Figure 6:
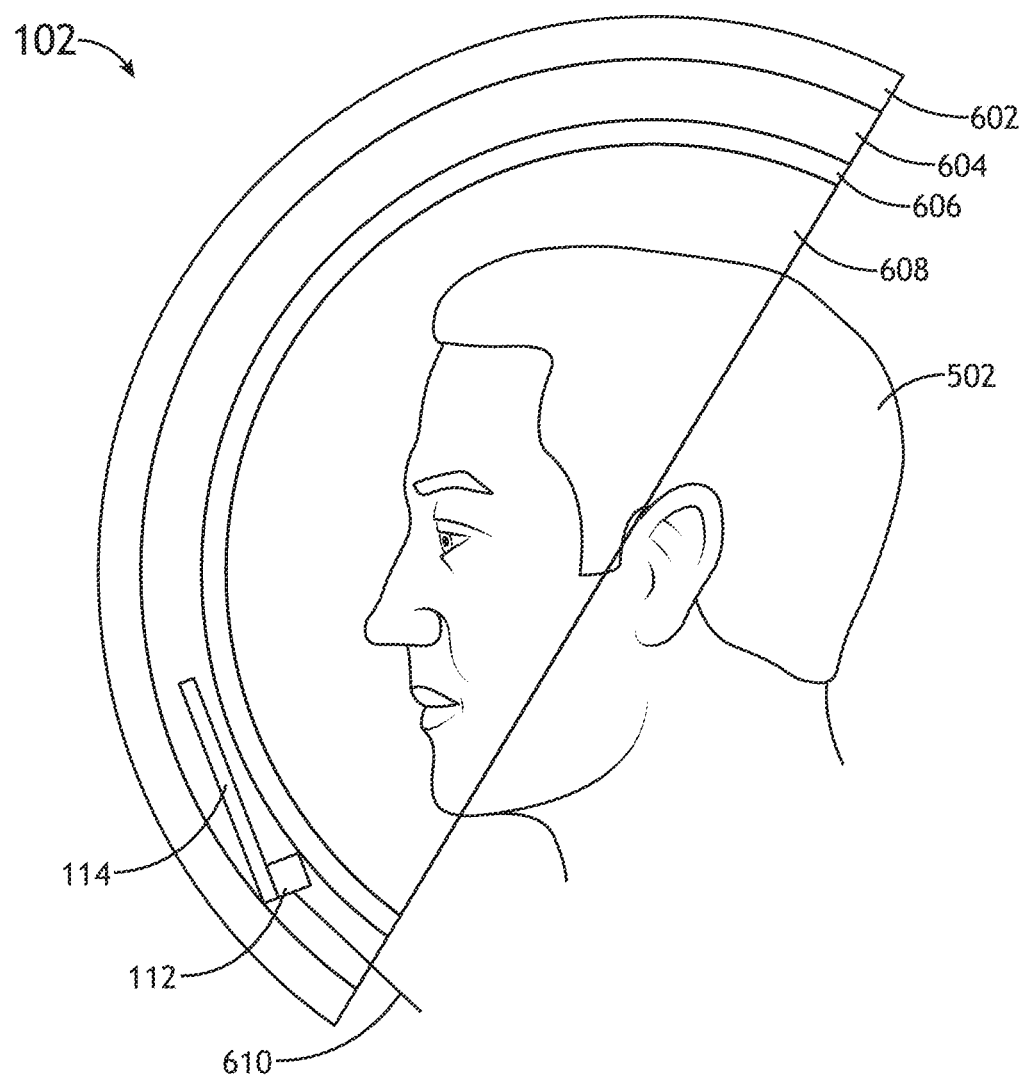
FIG. 6 is a view of an exemplary embodiment of the space suit helmet of FIG. 1 according to the inventive concepts disclosed herein.

As shown in FIG. 6, the waveguide display 111 may be mounted within space suit helmet 102 in between the first surface structure (e.g., the impact bubble 602) and the second surface structure (e.g., the pressure bubble 606). For example, the waveguide display 111 may be mounted to the ring 504 of the space suit helmet 102. For example, the waveguide display 111 may be positionable at any suitable height and lateral position. For example, the waveguide display 111 may be positioned at eye level such that (a) when the user 502 is looking straight ahead, the waveguide display 111 is in a field of view of at least one eye of the user 502 or (b) when the user 502 looks to the side (e.g., the left or right side), the waveguide display 111 is in a field of view of at least one eye of the user 502. For example, the waveguide display 111 may be positioned at chin level level such that (a) when the user 502 is looking down and straight ahead, the waveguide display 111 is in a field of view of at least one eye of the user 502 or (b) when the user 502 looks down and to the side (e.g., the left or right side), the waveguide display 111 is in a field of view of at least one eye of the user 502. For example, as shown in FIG. 6, positioning the optical system 112 outside of the oxygenated interior cavity 608 may reduce a likelihood of an electrical spark causing combustion. For example, as shown in FIG. 6, positioning the waveguide display 111 between the first surface structure (e.g., the impact bubble 602) and the second surface structure (e.g., the pressure bubble 606) may protect the waveguide display 111 and maximize a volume inside of the pressure bubble 606 for the user 502 to move around in the pressure bubble 606 and not bump into the waveguide display 111.

Figure 7:
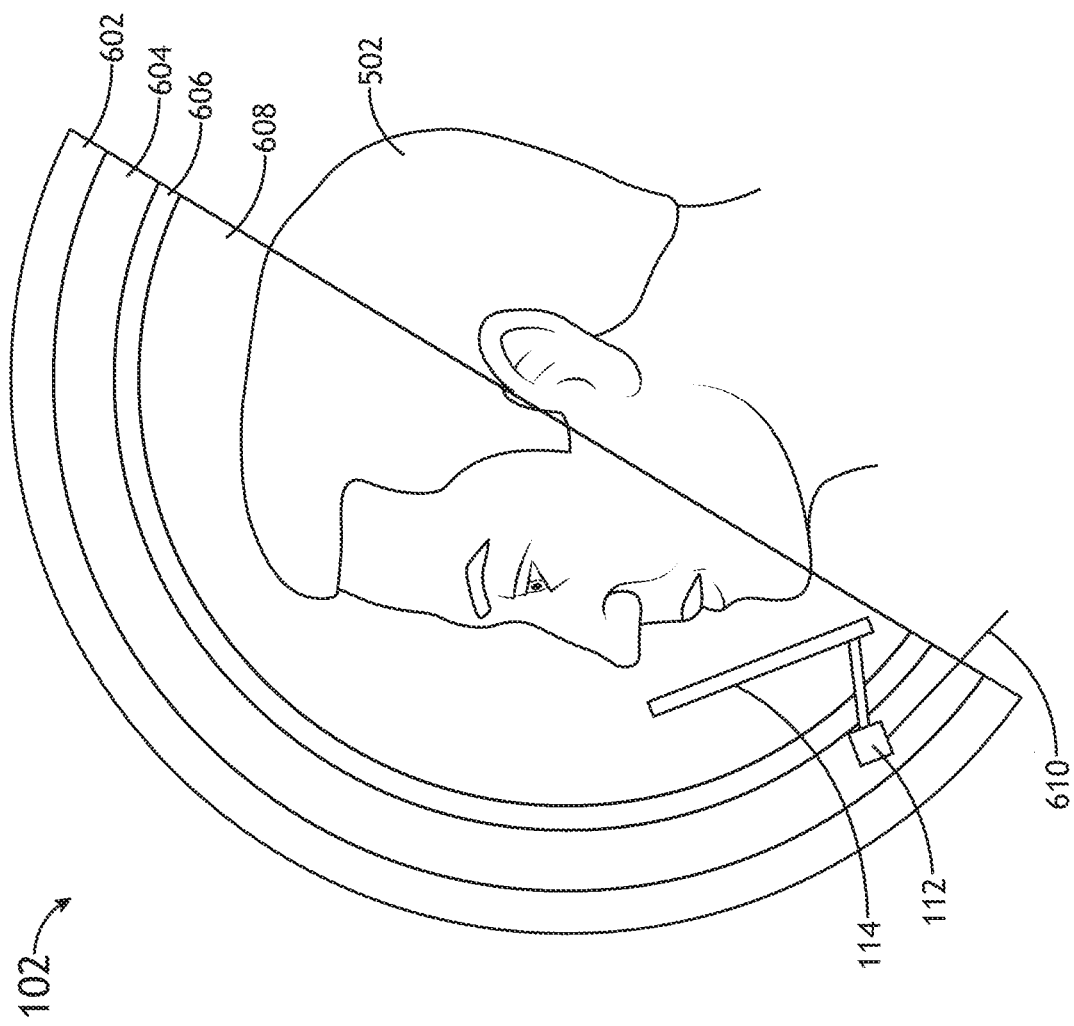
FIG. 7 is a view of an exemplary embodiment of the space suit helmet of FIG. 1 according to the inventive concepts disclosed herein.

As shown in FIG. 7, the waveguide display 111 may be mounted within space suit helmet 102. For example, the optical system 112 may be mounted in between the first surface structure (e.g., the impact bubble 602) and the second surface structure (e.g., the pressure bubble 606). For example, the waveguide 114 may be mounted at least in part in the interior cavity 608. In some embodiments, the optical system 112 may be configured to project images through the inner surface structure and the waveguide 114 to be displayed to the user. In some embodiments, the waveguide 114 may extend through the inner surface structure to within the interior cavity 608. For example, the optical system 112 may be mounted to the ring 504 of the space suit helmet 102. For example, the waveguide 114 may be positionable at any suitable height and lateral position. For example, the waveguide 114 may be positioned at eye level such that (a) when the user 502 is looking straight ahead, the waveguide display 111 is in a field of view of at least one eye of the user 502 or (b) when the user 502 looks to the side (e.g., the left or right side), the waveguide display 111 is in a field of view of at least one eye of the user 502. For example, the waveguide 114 may be positioned at chin level such that (a) when the user 502 is looking down and straight ahead, the waveguide display 111 is in a field of view of at least one eye of the user 502 or (b) when the user 502 looks down and to the side (e.g., the left or right side), the waveguide display 111 is in a field of view of at least one eye of the user 502. For example, as shown in FIG. 7, positioning the optical system 112 outside of the oxygenated interior cavity 608 may reduce a likelihood of an electrical spark causing combustion.

Figure 8:
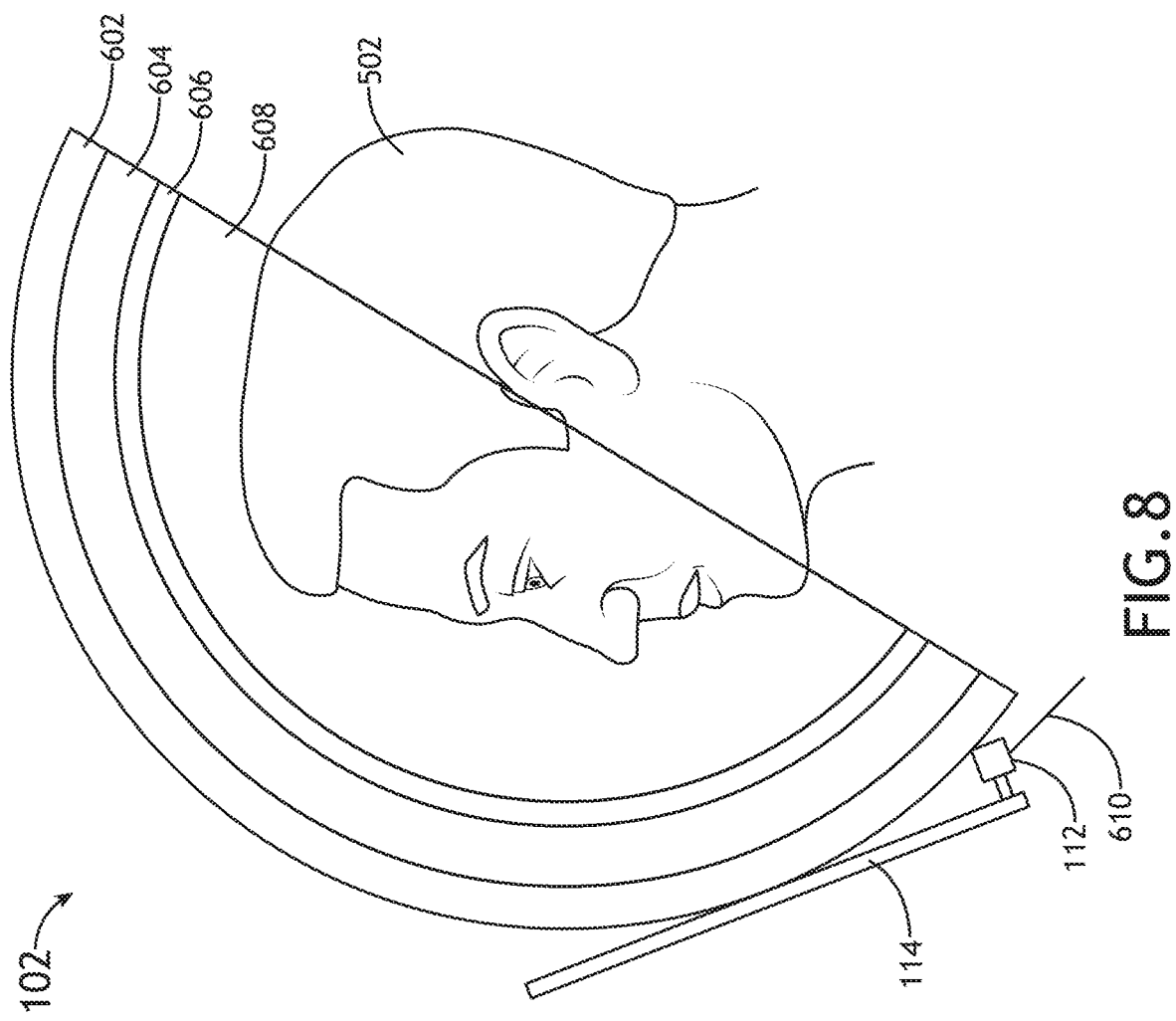
FIG. 8 is a view of an exemplary embodiment of the space suit helmet of FIG. 1 according to the inventive concepts disclosed herein.

As shown in FIG. 8, the waveguide display 111 may be mounted on an exterior of the space suit helmet 102 such that the outer surface structure is positioned between the waveguide display 111 and the inner surface structure. For example, the waveguide display 111 may be mounted to an exterior of the ring 504 of the space suit helmet 102. For example, the waveguide display 111 may be positionable at any suitable height and lateral position. For example, the waveguide display 111 may be positioned at eye level such that (a) when the user 502 is looking straight ahead, the waveguide display 111 is in a field of view of at least one eye of the user 502 or (b) when the user 502 looks to the side (e.g., the left or right side), the waveguide display 111 is in a field of view of at least one eye of the user 502. For example, the waveguide display 111 may be positioned at chin level such that (a) when the user 502 is looking down and straight ahead, the waveguide display 111 is in a field of view of at least one eye of the user 502 or (b) when the user 502 looks down and to the side (e.g., the left or right side), the waveguide display 111 is in a field of view of at least one eye of the user 502. For example, as shown in FIG. 8, positioning the optical system 112 outside of the oxygenated interior cavity 608 may reduce a likelihood of an electrical spark causing combustion.

Referring now to FIG. 9, an exemplary embodiment of a method 900 according to the inventive concepts disclosed herein may include one or more of the following steps. Additionally, for example, some embodiments may include performing one more instances of the method 900 iteratively, concurrently, and/or sequentially. Additionally, for example, at least some of the steps of the method 900 may be performed in parallel and/or concurrently. Additionally, in some embodiments, at least some of the steps of the method 900 may be performed non-sequentially. Additionally, in some embodiments, at least some of the steps of the method 900 may be performed in sub-steps of providing various components.

A step 902 may include providing a space suit helmet, comprising a surface structure, an inner surface structure, and a waveguide display, wherein the inner surface structure is configured to maintain an oxygenated environment within an interior cavity of the space suit helmet, wherein a user is able to see through the inner surface structure and the surface structure, wherein the waveguide display is implemented at least one of in or on the space suit helmet, wherein the waveguide display comprises a waveguide and an optical system configured to project images at least through the waveguide to be displayed to the user.

Further, the method 900 may include any of the operations disclosed throughout.

As will be appreciated from the above, embodiments of the inventive concepts disclosed herein may be directed to a method and a system including a space suit helmet having a waveguide display.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a space suit helmet, comprising:
a surface structure;
an inner surface structure, wherein the inner surface structure is configured to maintain an oxygenated environment within an interior cavity of the space suit helmet, wherein a user is able to see through the inner surface structure and the surface structure; and
a waveguide display implemented at least one of in or on the space suit helmet, the waveguide display comprising:
a waveguide positioned at least in part in the interior cavity; and
an optical system configured to project images at least through the waveguide to be displayed to the user.

2. The system of claim 1, wherein the optical system is positioned between the inner surface structure and the surface structure, wherein the optical system is configured to project images through the inner surface structure and the waveguide to be displayed to the user.

3. The system of claim 1, wherein the optical system is positioned between the inner surface structure and the surface structure, wherein the waveguide extends through the inner surface structure to within the interior cavity.

4. The system of claim 1, wherein the waveguide includes a tint layer.

5. The system of claim 4, wherein the tint layer is an electrochromic layer configured to shift from transparent to less transparent based on an electric stimulus.

6. The system of claim 1, wherein the space suit helmet further comprises at least one processor configured to output graphical data to the optical system, wherein the space suit helmet further comprises an eye tracking system configured to track eye movement of the user, wherein the eye tracking system is configured to output eye tracking data to the to the at least one processor, wherein the at least one processor is further configured to control operation of the optical system based at least on the eye tracking data.

7. The system of claim 6, wherein the at least one processor is further configured to control whether the optical system is in an active state or deactivated state based at least on the eye tracking data.

8. The system of claim 6, wherein the at least one processor is further configured to receive a user input based at least on the eye tracking data, wherein the at least one processor is further configured to control content displayed by the waveguide display based at least on the user input.

9. The system of claim 6, wherein the space suit helmet further comprises a voice recognition system configured to receive voice commands from the user, wherein the voice recognition system is configured to output voice command data to the at least one processor, wherein the at least one processor is further configured to control operation of the optical system based at least on the voice command data.

10. The system of claim 6, wherein the space suit helmet further comprises a suit tracking system configured to track a direction of where a field of view (FOV) through the waveguide display is pointing and output suit tracking data to the at least one processor, wherein the at least one processor is further configured to control operation of the optical system based at least on the suit tracking data.

11. The system of claim 1, wherein the space suit helmet further comprises at least one processor configured to output graphical data to the optical system, wherein the at least one processor is further configured to steer a field of view of the waveguide display.

12. A method, comprising:
providing a space suit helmet, comprising a surface structure, an inner surface structure, and a waveguide display, wherein the inner surface structure is configured to maintain an oxygenated environment within an interior cavity of the space suit helmet, wherein a user is able to see through the inner surface structure and the surface structure, wherein the waveguide display is implemented at least one of in or on the space suit helmet, wherein the waveguide display comprises a waveguide positioned at least in part in the interior cavity and an optical system configured to project images at least through the waveguide to be displayed to the user.

13. A system, comprising:
a space suit helmet, comprising:
a surface structure;
an inner surface structure, wherein the inner surface structure is configured to maintain an oxygenated environment within an interior cavity of the space suit helmet, wherein a user is able to see through the inner surface structure and the surface structure; and
a waveguide display implemented at least one of in or on the space suit helmet, wherein the waveguide display is positioned on an exterior of the space suit helmet such that the surface structure is positioned between the waveguide display and the inner surface structure, the waveguide display comprising:
a waveguide; and
an optical system configured to project images at least through the waveguide to be displayed to the user.

14. A system, comprising:
a space suit helmet, comprising:
a surface structure;
an inner surface structure, wherein the inner surface structure is configured to maintain an oxygenated environment within an interior cavity of the space suit helmet, wherein a user is able to see through the inner surface structure and the surface structure;
a gap between the surface structure and the inner surface structure; and
a waveguide display positioned in the gap between the inner surface structure and the surface structure, the waveguide display comprising:
a waveguide; and
an optical system configured to project images at least through the waveguide to be displayed to the user.

15. The system of claim 14, wherein the waveguide includes a tint layer.

16. The system of claim 15, wherein the space suit helmet further comprises at least one processor configured to output graphical data to the optical system, wherein the space suit helmet further comprises an eye tracking system configured to track eye movement of the user, wherein the eye tracking system is configured to output eye tracking data to the at least one processor, wherein the at least one processor is further configured to control operation of the optical system based at least on the eye tracking data, wherein the space suit helmet further comprises a suit tracking system configured to track a direction of where a field of view (FOV) through the waveguide display is pointing and output suit tracking data to the at least one processor, wherein the at least one processor is further configured to control operation of the optical system based at least on the suit tracking data.

17. The system of claim 16, wherein the tint layer is an electrochromic layer, wherein the at least one processor is further configured to control an amount of tint of the electrochromic layer based at least on a sensed brightness and the eye tracking data.

18. The system of claim 17, wherein the tint layer is an electrochromic layer, wherein the at least one processor is further configured to control the amount of tint of the electrochromic layer based at least on the sensed brightness, the eye tracking data, voice command data, and the suit tracking data.

* * * * *